United States Patent
McUmber et al.

(10) Patent No.: US 7,088,241 B2
(45) Date of Patent: Aug. 8, 2006

(54) BUSINESS PROCESS FOR DISSEMINATING PILOT WEATHER DATA BY VOICE

(75) Inventors: William E. McUmber, Rives Junction, MI (US); Marilyn Wulfekuhler, Lansing, MI (US)

(73) Assignee: Mackinac Software, LLC, Lansing, MI (US)

(*) Notice: Subject to any disclaimer, the term of this patent is extended or adjusted under 35 U.S.C. 154(b) by 125 days.

(21) Appl. No.: 10/978,872

(22) Filed: Oct. 29, 2004

(65) Prior Publication Data

US 2005/0094783 A1     May 5, 2005

Related U.S. Application Data

(60) Provisional application No. 60/516,160, filed on Oct. 31, 2003.

(51) Int. Cl.
*H04Q 7/00*     (2006.01)
(52) U.S. Cl. .............. 340/539.28; 340/949; 455/414.3; 379/88.17; 379/88.23
(58) Field of Classification Search ................ 340/949, 340/968, 945, 539.28; 455/414.3; 702/3; 379/88.13, 88.23
See application file for complete search history.

(56) References Cited

U.S. PATENT DOCUMENTS

| | | | | |
|---|---|---|---|---|
| 4,295,139 A | * | 10/1981 | Arpino | 340/870.01 |
| 5,323,565 A | * | 6/1994 | Kappers et al. | 52/36.4 |
| 5,757,322 A | * | 5/1998 | Ray et al. | 342/460 |
| 6,181,260 B1 | * | 1/2001 | Simon et al. | 340/949 |
| 6,590,529 B1 | * | 7/2003 | Schwoegler | 342/357.13 |
| 6,675,098 B1 | * | 1/2004 | Peek et al. | 702/3 |
| 6,828,922 B1 | * | 12/2004 | Gremmert et al. | 340/949 |
| 6,968,187 B1 | * | 11/2005 | Irwin et al. | 455/431 |

* cited by examiner

*Primary Examiner*—Jeffery Hofsass
*Assistant Examiner*—Hoi C. Lau
(74) *Attorney, Agent, or Firm*—Harness, Dickey & Pierce, PLC

(57) ABSTRACT

A computer-implemented method and system is provided for delivering immediate (up to the minute) aviation weather information. A pilot makes a call to a single toll free number and specifies the location he wants to receive weather from. The system and method disambiguates the location and then checks to see if immediate weather data is already available within the system for that location. An informational message tailored to both the pilot and the location may be delivered to the user prior to the weather information. If immediate weather data is already available in the described system, that weather data is communicated to the user via a computer-generated voice. If not, the system and method determines the voice phone number for the Automated Weather Observation System (AWOS) at the specified location, and connects the user by phone directly to the immediate weather information as generated by the AWOS at that location.

16 Claims, 5 Drawing Sheets

BUSINESS PROCESS FOR DISSEMINATING PILOT WEATHER DATA BY VOICE

CROSS-REFERENCE TO RELATED APPLICATIONS

This application claims the benefit of U.S. Provisional Application No. 60/516,160, filed on Oct. 31, 2003 The disclosure of the above application is incorporated herein by reference.

FIELD OF THE INVENTION

The present invention relates generally to computer-implemented immediate aviation weather delivery systems and computer-assisted immediate aviation weather delivery business methods.

BACKGROUND OF THE INVENTION

Obtaining current weather data at various locations, including destination and en route airports, is crucial for the operation of all types of aircraft. Early in the advent of aviation during the 1930's, weather data was gathered by observers at designated locations, usually airports. A typical observation included temperature, barometric pressure, wind speed and direction, visibility, cloud conditions, and information about currently occurring weather conditions such as rain or fog. The observation data was then sent down a common teletype circuit to Flight Service Stations for any pilots interested in conditions. With few modifications, this system continued largely unchanged until 1961 when an agreement was reached between the then new Federal Aviation Administration (FAA) and the National Weather Service (NWS) to allow Flight Service Station (FSS) briefers to interpret weather forecasts and charts for pilot briefings.

Hourly observations and occasional special observations, collectively called sequence reports, were transmitted using teletype communications until the mid 1970's. At that time, a new automated system was implemented to allow observations to be forwarded to a central location from which the observation could be obtained by any FSS. The mid 1970's also saw the beginning of a phase-out of local FSS stations in favor of "super FSS" stations with higher levels of automation. Consolidation concluded in the late 1990's, however observations were still largely hourly in frequency and flowed through a central clearing point. By the 1990's, the observation name was changed from sequence report to METAR and incorporated ICAO international reporting standards. With the consolidation of FSS stations, pilots were unable to visit their local FSS and instead had to rely on telephone briefings from one of the "super FSS" stations. The FAA also added Direct Access User Terminal (DUAT) online access for pilots only. DUAT provides exactly the same information available from FSS in the same time frame, but alleviates the need for a telephone call to FSS.

During the early 1980's, human weather observers were gradually replaced with automated weather reporting systems. Such a system, called Automated Weather Observation System (AWOS) is essentially a computer coupled with a bank of sensors for making and reporting observations. The observations are played continually via computer-generated voice over an assigned radio frequency. AWOS systems also have telephone lines that may be called to hear the computer generated voice observation. More recently systems known as Automated Surface Observation Systems (ASOS) have been deployed. The primary difference between a typical AWOS and an ASOS lies in the ASOS's enhanced observation capabilities. Otherwise, both the AWOS and ASOS report current observations via voice on a telephone line or over an assigned radio frequency. Additionally, larger airports with control towers often play recorded voice tape loops containing local airport notices and weather information over an assigned radio frequency. The weather information is still based on the most recent hourly observation. The tape loop system is known as Automated Terminal Information System (ATIS), and increasingly, is accessible through a telephone line. Within approximately the last ten years the weather portion of the message, previously recorded by a person, is being replaced by computer generated AWOS weather tagged to the end of the recording. Collectively, we will refer to all automated observation systems (AWOS, ASOS, and ATIS) as "AWOS" systems.

Starting in the 1980's, the FAA deployed about 600 AWOS stations nationwide. The federally deployed AWOS stations all have telephone lines and all report data in digital form to the FAA central location. However, since aviation weather data has an extreme bearing on aviation safety, many non-federal entities began to deploy AWOS systems on their own. Some of these report digital data, but many do not, leaving the radio broadcast and telephone line as the only way to obtain the observation. Today there are over 1,700 AWOS system nationally with more being added continually. A significant number of AWOS systems report their observations either through the National Oceanic and Atmospheric Administration (NOAA) or FAA central computer systems for subsequent dissemination to interested parties; however, an observation can still be 20 minutes to an hour old by the time the end-user obtains it. Weather phenomenon like thunderstorms can build from non-existent to significant risk in as little as ten minutes, hence there is a need for the pilot to obtain real time weather easily, for any location. Although the World Wide Web has seen the growth of a number of weather oriented sites, including those that cater specifically to aviation weather data, all draw from the same central location whose observations, as noted above, can be up to an hour old. Furthermore, internet access has not penetrated significantly enough to be accessible from more than a very small percentage of airports. In contrast, telephony has penetrated to virtually ever corner of the country, especially when cellular telephones are considered. This is especially true of airports not associated with larger metropolitan areas where a current observation can be difficult to obtain. The embodiment of the present invention solves the currency problem for weather data in a way that only requires traditional telephone access.

SUMMARY OF THE INVENTION

The present invention addresses obtaining current weather data by using information obtained directly from the AWOS stations. Users call a central computer via telephone. The computer prompts for the airport identifier for airport in question. After disambiguating the airport identifier from others that have the same telephone keypad sequence, the central computer consults a database of current observations directly from the AWOS. If available, the computer generates the voice observation for the user to hear. If a current observation is not available, the computer consults another database of telephone numbers for AWOS systems. Subsequently, the computer places a voice call to the AWOS and arranges for the calling user to hear in real-time the resulting voice report directly from the AWOS system. While it is technically feasible for a user to place a call directly to the AWOS himself, this assumes he knows the correct phone number. This invention includes maintaining a current database of AWOS telephone numbers, many of which are unpublished or difficult to find. In order to keep the AWOS phone numbers current, the current invention uses data gathered from the field to update the phone numbers. Current phone numbers are sent via email to the central computer. After a verification procedure, the database is updated with the new number. The email originates with an interested party, such as an airport manager, maintenance personnel or other parties in a position to know about changes at the AWOS.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DESCRIPTION OF THE PREFERRED EMBODIMENT OF INVENTION

The following description of the preferred embodiment(s) is merely exemplary in nature and is in no way intended to limit the invention, its application, or uses.

Figure 1:
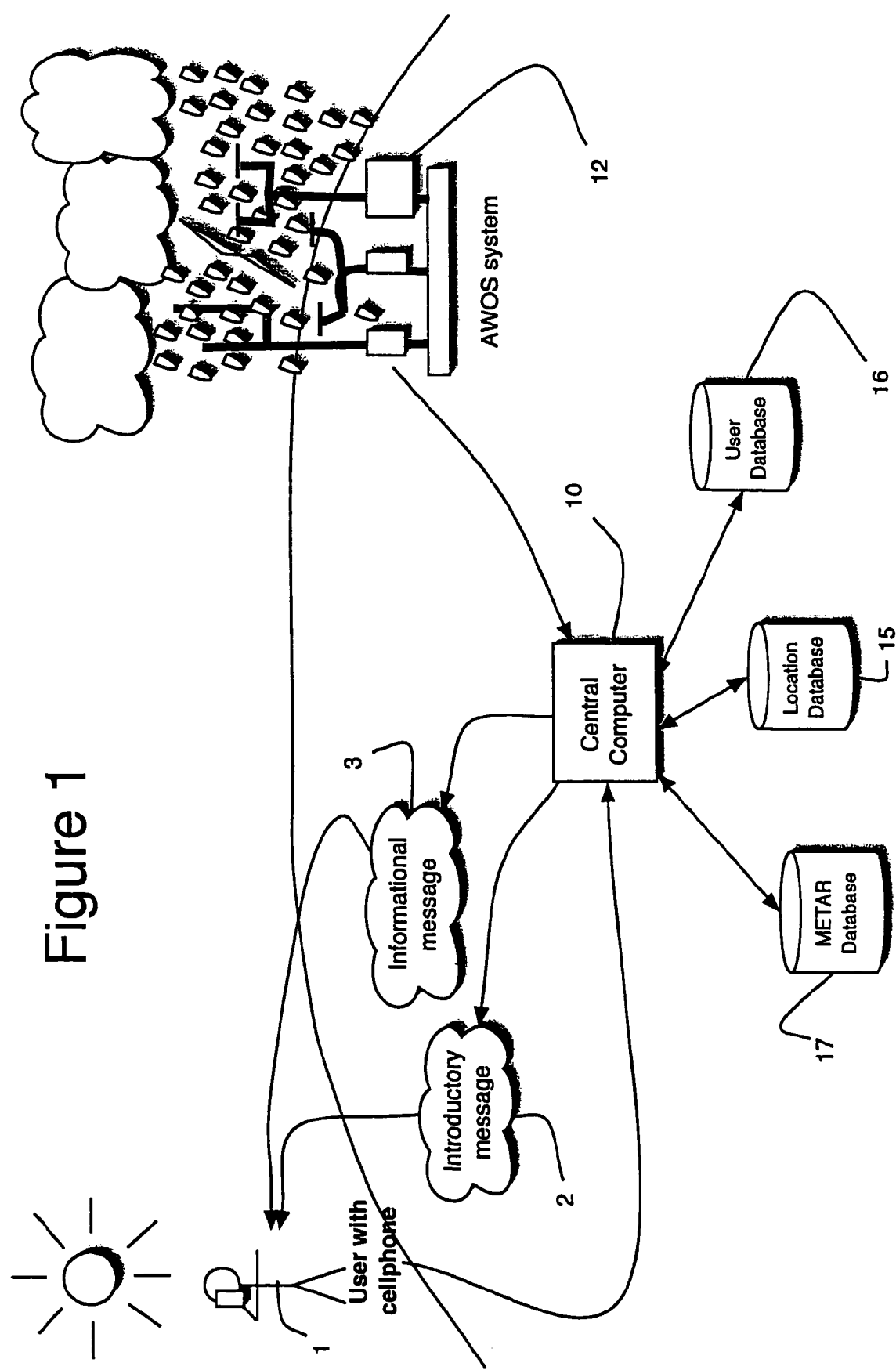
FIG. 1 is a diagram which represents the overall operation of the computer-implemented immediate aviation weather delivery system.

FIG. 1 presents the preferred embodiment of the invention. User 1 calls a central telephone number where the central computer 10 answers the call. Central computer 10 plays introductory messages 2 to the user and asks for the airport identifier. Location database 15 is consulted with the keypad sequence representing the requested identifier to determine the correct airport being requested. Central computer 10 has obtained the user's phone number from caller ID information (when available), and can additionally use this information to determine the likely airport the use is requesting. For example, an area code of 907 indicates the call is coming from Alaska, and Alaska is very likely the area the user is interested in. Detailed preferences for subscribing users are kept in user database 16, where information, such as how to decide disambiguation on a per user basis is kept.

Central computer 10 may also accept a special keypad sequence that maps to no specific airport, but rather to a special list of airports stored in location database 15. This capability is used primarily for special events where there is high interest in airports within a certain area, but whose location codes are otherwise unrelated. For example, a keypad code of "000" can map to five or ten airports around the Oskosh, Wis. area during the EAA "AirVenture" convention. During AirVenture, Oshkosh becomes the busiest airport in the country, and the surrounding area experiences very high aircraft traffic.

The result of this process is presentation to user 1 of a list of potential airports. If the list is exactly one in length, this step can be skipped. The user 1 next chooses the location he is interested in from a numbered list presented by voice.

Central computer 10 next optionally plays informational message 3 to the user, which may be a commercial message, public service announcement, or some other form of message. The message is tailored because the central computer knows both the location being requested and potentially, the user's identity. For example, if the airport identifier DTW (Wayne Country Metropolitan airport, Detroit, Mich.) were entered, the message may concern something specific to the Detroit area. At the conclusion of informational message 3, (if a message is played) central computer 10 consults METAR database 17 to determine if there is a current observation. If so, the observation is composed into a voice message that is played to the user. If not, location database 15 is consulted to determine the telephone number of AWOS system 12. Central computer 10 dials the number and either transfers the call, bridges the user's call to the AWOS call, or otherwise plays the current AWOS system 12 generated voice to user 1. When user 1 hangs up, the system cycles back to the start to await another call.

Figure 2:
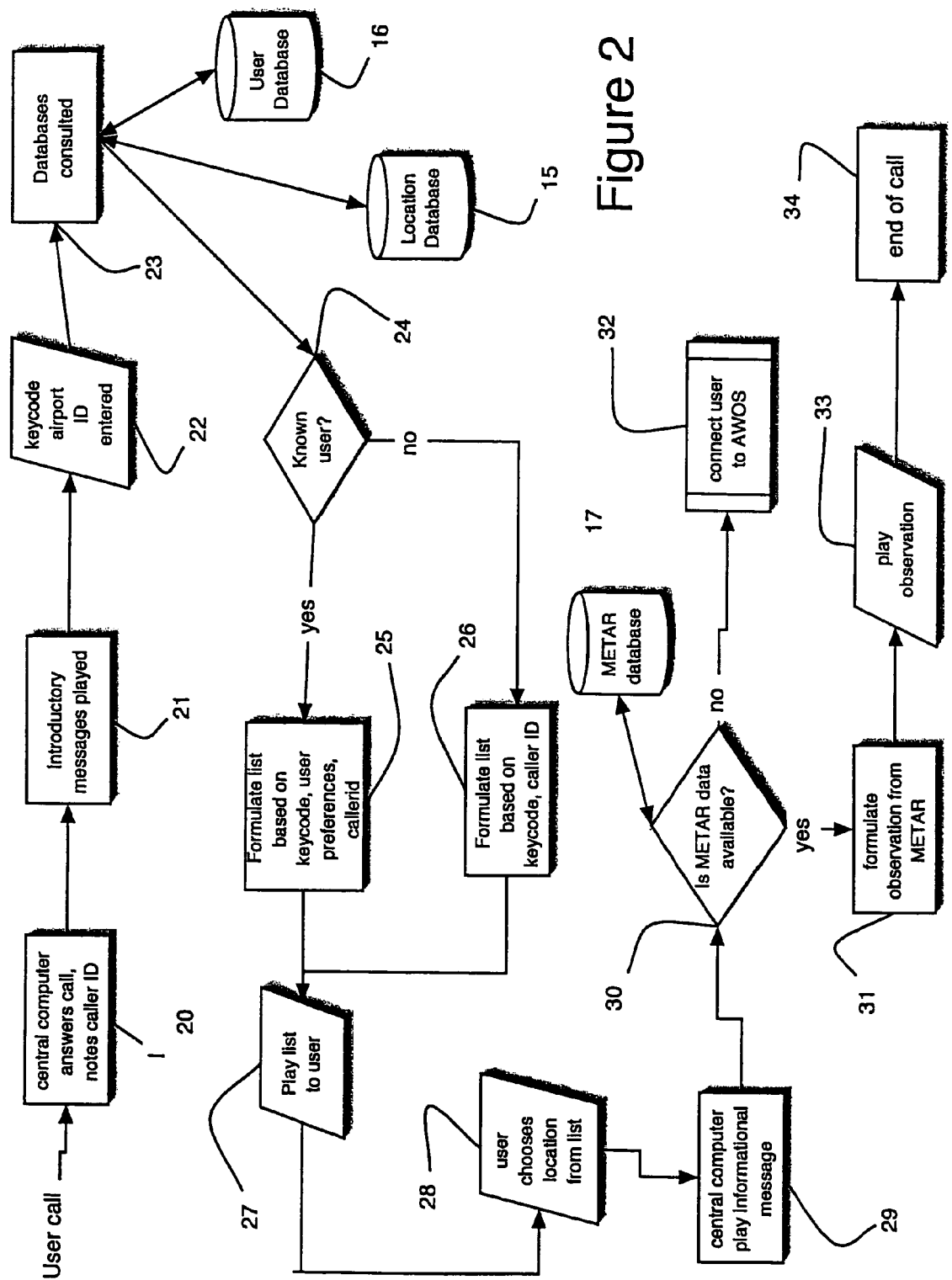
FIG. 2 is a flowchart which describes the operational steps involved in processing a user's request for immediate aviation weather.

FIG. 2 shows the flow when a call is received from a user. In process block 20 the central computer answers the phone and saves the caller ID if it is available. In process block 21 the introductory message is played to the user, which includes a request for the airport ID to be entered on the telephone keypad. In input block 22 the user enters a keycode that is translated to a location ID in process block 23 by consulting the location database. In decision block 24, if the user is known, based on caller ID and user database 16, a specially formulated disambiguation list is constructed in process block 25, otherwise, a disambiguation list is based on the keycode and possibly caller ID is constructed in process block 26. Disambiguation is required because a keycode sequence can represent many possible location IDs. For example, keycode "234" can represent "ADG", "BEG", or 25 other possible codes.

FIG. 2, process 25 depicts the construction of a list for the user to choose from based on preferences and keycode. The preferences may be set through a web interface based on the user's phone number or user ID. The preferences could include the restriction that only certain airports appear in the disambiguation list. The tailoring could be based on airport location (east of the Mississippi, none from Ohio, etc), or on airport class (none with runways shorter than 3500 feet, only ones with instrument approach procedures), or could be based on an explicit list specified by the user. The system may also keep track of the locations called most frequently by the user and tailor the disambiguation list based on the most likely locations to be requested. As above, this option would be enabled or disabled through a preference specified by the user, for example via a web screen. Similarly, the user may wish to store a set of custom lists from which to chose locations. Instead of an airport code, the user would enter one of the special list codes that would trigger the pre-stored list of locations. For example, code "001" may produce a list of five otherwise unrelated airports to chose from. All of these special capabilities are included in process 25 in FIG. 2.

In output block 27 the list constructed is played to the user. In input block 28 the user enters the list item number to identify a location. In process block 29, an informational message is optionally played to the user. Next, decision block 30 decides if digital METAR data is available from the AWOS. If it is, a voice observation is constructed in process block 31 and played in output block 33 followed by end of call processing in complex process block 34. If METAR data is not available, complex process block 32 connects to the AWOS.

Figure 3A:
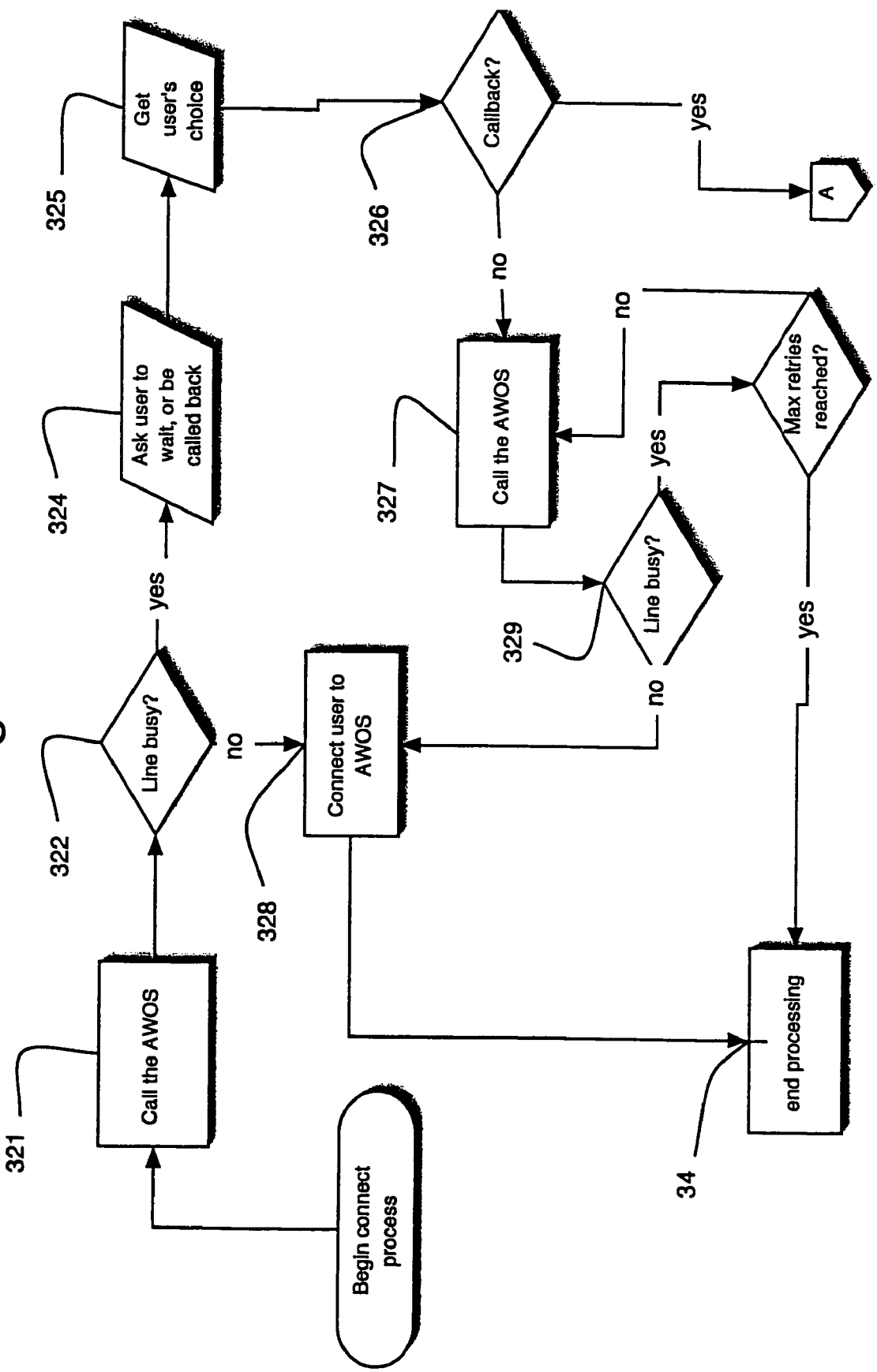
FIG. 3a is a flowchart which describes in detail the complex processing block 32 listed in FIG. 2.
Figure 3B:
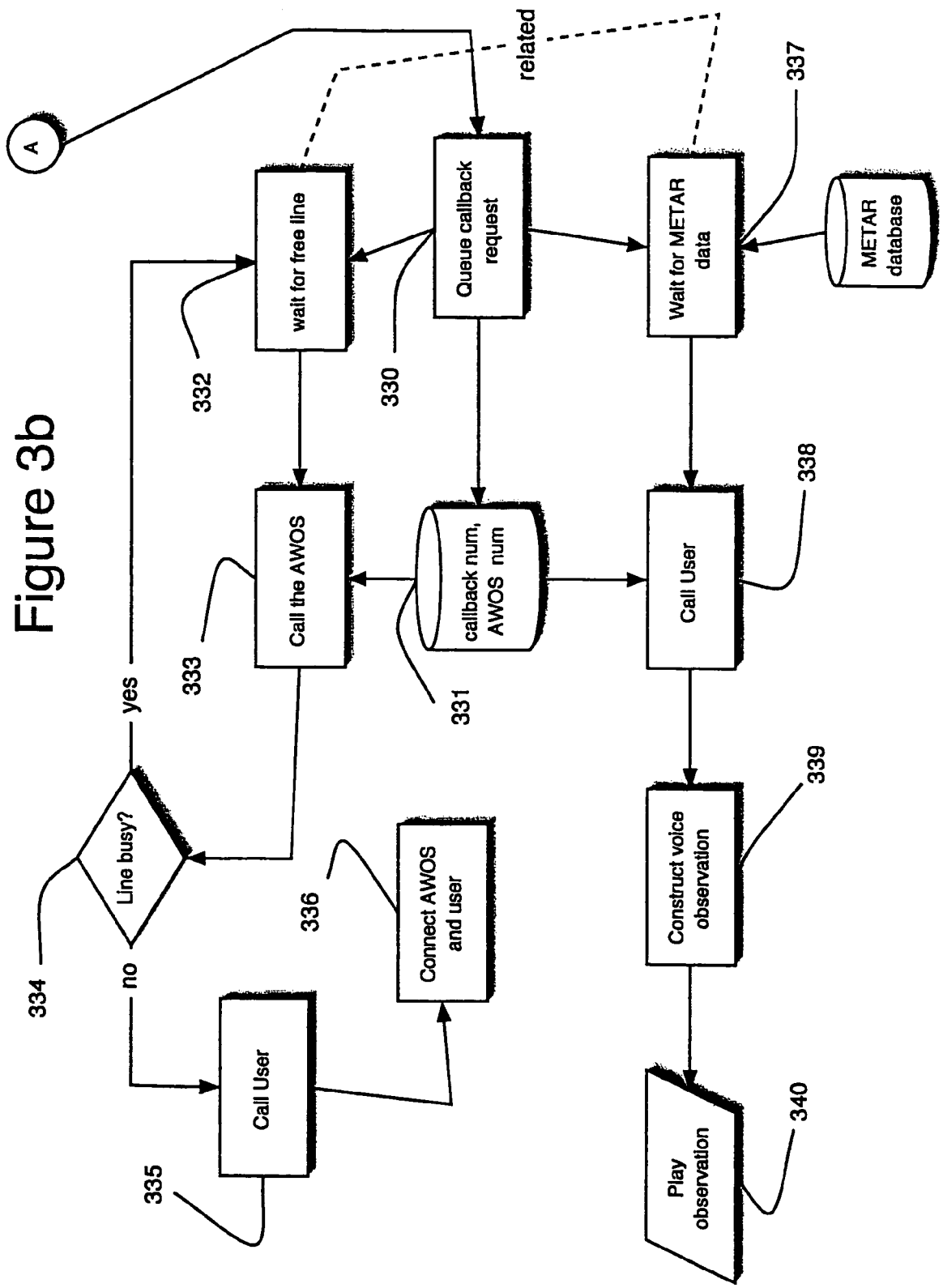
FIG. 3b is a flowchart which continues describing in detail the complex processing block 32 listed in FIG. 2.

FIG. 3a depicts the details of complex process block 32 in FIG. 2. Process block 321 call the AWOS telephone number. If decision in block 322 is not busy, the connection to between the user and the AWOS is completed in process block 328. Otherwise, the user is asked in output block 324 to either wait for the AWOS to become available or receive a callback when the AWOS is available. If the user's choice, obtained in input block 325 is to wait, a loop consisting of process block 327 and decision block 329 is entered until the line is available, at which time the user is connected to the AWOS in process block 328, or a maximum number of retries have been processed, in which case the call is terminated. If the user elects to receive a callback, the process continues in FIG. 3b via page connector A. In FIG. 3b, in process block 330, the request is queued to datastore 331 for periodic review (over a short period of time). Process block 332 waits for resources to become available to retry the call while process block 337 waits for the arrival of new METAR data. When line resources are available, the call is retried in process block 333 and decision block 334. During this time, the user is not connected to the system. If the AWOS is not busy, process block 335 calls the user while the AWOS is still connected, and process block 336 connects the user and AWOS. The connection remains until either the AWOS or user hangs up. If METAR data becomes available in process block 337, the user is called back in process block 338 by referring to datastore 331; a voice observation is constructed in process block 339 and played in output block 340.

In addition to the typical flow of information as depicted in FIGS. 2, 3a, and 3b, the user may enter a code at any time to cause special actions to interrupt the current call processing. When the user enters a code, "#" for example, signifying a new location is desired, processing is interrupted, reset, and resumed at process block 21 in FIG. 2. This provides a means for a user to hear multiple locations with one call or to simply try an alternate location in the event of a called but busy AWOS location. Similarly, the user may enter a code, "*" for example, to signify entering a voice menu to change certain parameters for the duration of the current call. For example, if a user had previously selected restricted disambiguation lists as discussed earlier, he may wish to make all locations available for the duration of this call.

The user's preferences could also be used to request the central computer to call a user at a specified time with a specified set of observations. For example, a charter pilot flying a regular route at 8:00 AM each day may request the system to call him at 7:40 AM with a set of observations for the destination and airports along the flight route. The process could be essentially follow that shown in FIG. 3b, except the entry would not be queued until just prior to the requested time.

Figure 4:
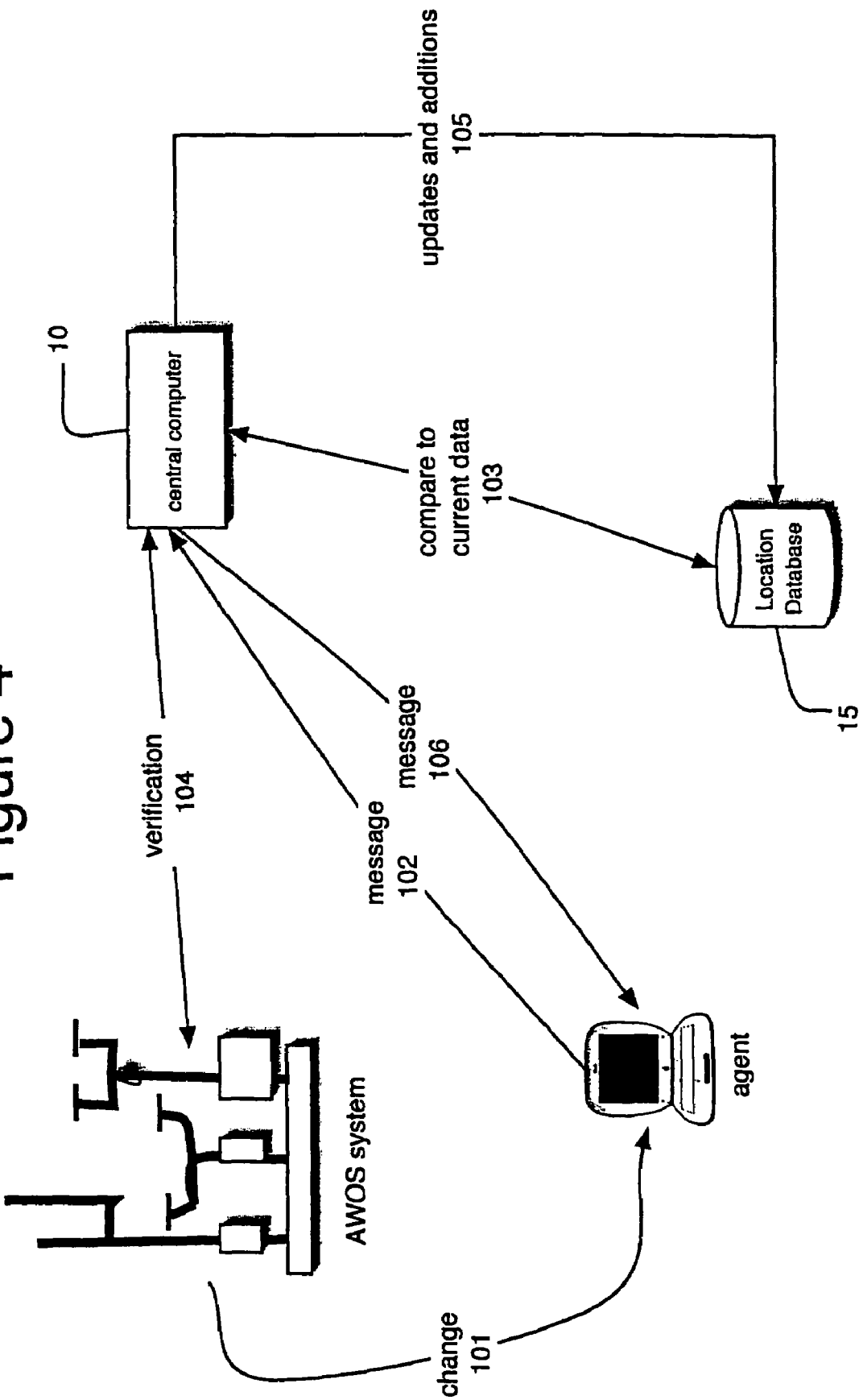
FIG. 4 is a diagram which describes the process of updating the Location Database.

FIG. 4 shows how the location database is kept current. Updating of the location database begins when an agent notices a change to the AWOS status, Subsequently, the agent sends message 102 to central computer 10. The source of the message can be email or a web transaction, and other forms of messages are possible. When message 102 arrives, the data, usually a new or modified phone number, is compared 103 to location database 15. If location database 15 is found to be correct, nothing more happens. If location database 15 appears to require any updates, verification 104 occurs to ensure accurate AWOS data. If accurate, updates 105 are made to location database 15.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A weather information system comprising:
   a call router capable of coupling an incoming call to a base telephone number with a weather information source;
   a database storing tuples that associate an airport identification indicia with at least one telephone number of an automated weather information system associated with an airport;
   a management system coupled to said call router and to said database that operates:
   (a) to prompt an incoming caller to supply an airport identification indicia;
   (b) to selectively retrieve a telephone number associated with said indicia; and
   (c) to selectively couple an incoming call with a weather information source using said retrieved telephone number so that weather information is provided through the incoming caller's telephone device.

2. The system of claim 1 wherein said management system includes mechanism for electronic update of said database.

3. The system of claim 2 wherein said mechanism for electronic update utilizes an email system.

4. The system of claim 1 wherein said management system includes a data channel for acquiring weather information from a weather information source and wherein said management system is configured to automatically acquire weather information for storage and subsequent dispensing to an incoming caller.

5. The system of claim 1 wherein said database is further configured to store weather information obtained from an automated weather information system.

6. The system of claim 5 wherein said database is configured to function as a weather information source.

7. The system of claim 4 wherein said data channel is a telemetry channel.

8. The system of claim 5 wherein said stored weather information comprises character data adapted to be made audible by a speech synthesis system.

9. The system of claim 5 wherein said stored weather information comprises audio data adapted for playback in an audible manner.

10. The system of claim 1 wherein said call router couples an incoming call to a weather information source by:
    (a) connecting with an automated weather information system by placing a second telephone call while the incoming call remains connected; and
    (b) establishing a connection between the incoming call and the second telephone call.

11. The system of claim 10 wherein said call router further couples an incoming call to a weather information source by:
    (c) dropping out of the established connection to thereby free up the base telephone number to receive another incoming call.

12. The system of claim 1 wherein said management system includes a voice prompting system to prompt said incoming caller to supply an airport identification indicia.

13. The system of claim 1 wherein said management system includes DTMF decoder capable of interpreting airport identification indicia supplied by touch tone codes.

14. The system of claim 1 wherein said management system includes a disambiguation system to select a single automated weather information system candidate from a plurality of candidates.

15. The system of claim 1 wherein said management system includes speech recognition system capable of interpreting airport identification indicia supplied by voice.

16. The system of claim 1 wherein said database includes a data store of cached weather information associated with at least a one of a plurality of automated weather information systems; and wherein management system selectively uses said retrieved telephone number to obtain weather information corresponding to a selected airport when said cached weather information associated with that selected airport is deemed stale or nonexistent.

* * * * *